United States Patent
Rivas Silva et al.

(10) Patent No.: US 10,725,764 B2
(45) Date of Patent: Jul. 28, 2020

(54) SYSTEM AND METHOD FOR REPROGRAMMING ECU DEVICES (ELECTRONIC CONTROL UNITS) IN VEHICLES, VIA DIGITAL RADIO

(71) Applicant: Instituto Tecnológico y de Estudios Superiores de Occidente, A. C., Tlaquepaque, Jalisco (MX)

(72) Inventors: Héctor Antonio Rivas Silva, Tlaquepaque (MX); Luis Enrique González Jiménez, Tlaquepaque (MX); Riemann Ruiz Cruz, Tlaquepaque (MX); Raúl Campos Rodriguez, Tlaquepaque (MX)

(73) Assignee: INSTITUTO TECNOLOGICO Y DE ESTUDIOS SUPERIORES DE OCCIDENTE, A.C, Tlaquepaque (MX)

(*) Notice: Subject to any disclaimer, the term of this patent is extended or adjusted under 35 U.S.C. 154(b) by 303 days.

(21) Appl. No.: 15/742,520

(22) PCT Filed: Jul. 17, 2015

(86) PCT No.: PCT/MX2015/000106
§ 371 (c)(1),
(2) Date: Jan. 7, 2018

(87) PCT Pub. No.: WO2017/010859
PCT Pub. Date: Jan. 19, 2017

(65) Prior Publication Data
US 2018/0196660 A1 Jul. 12, 2018
US 2019/0155590 A2 May 23, 2019

(30) Foreign Application Priority Data

Jul. 16, 2015 (MX) .................. MX/A/2015/009228

(51) Int. Cl.
*G06F 8/65* (2018.01)
*H04H 20/62* (2008.01)
(Continued)

(52) U.S. Cl.
CPC ................ *G06F 8/65* (2013.01); *G06F 21/44* (2013.01); *H04H 20/62* (2013.01); *H04H 20/91* (2013.01);
(Continued)

(58) Field of Classification Search
CPC ........... G06F 8/65; G06F 21/44; H04H 20/91; H04H 20/62; H04H 60/14; H04L 67/34;
(Continued)

(56) References Cited

U.S. PATENT DOCUMENTS 6,275,585 B1    8/2001    Ablay et al.
8,014,446 B2    9/2011    Shah et al.
(Continued)

OTHER PUBLICATIONS

International Search Report (Form ISA/210) for International Application No. PCT/MX2015/000106 dated Mar. 1, 2016 (3 pages).
(Continued)

*Primary Examiner* — Dale W Hilgendorf
(74) *Attorney, Agent, or Firm* — Feeney Law Group; Alan F. Feeney

(57) ABSTRACT

The disclosure describes a system and method for the reprogramming of the electronic control units (ECU) devices simultaneously in one or more motor vehicles using a radio broadcast system to transmit a digital radio signal to a receiving electronic control units (ECU) device present in the motor vehicles.

4 Claims, 5 Drawing Sheets

(51) Int. Cl.
*H04H 20/91* (2008.01)
*G06F 21/44* (2013.01)
*H04L 29/06* (2006.01)
*H04L 29/08* (2006.01)
*H04H 60/14* (2008.01)
*B60W 50/04* (2006.01)

(52) U.S. Cl.
CPC ............ *H04L 63/08* (2013.01); *H04L 67/125* (2013.01); *H04L 67/34* (2013.01); *B60W 2050/046* (2013.01); *H04H 60/14* (2013.01); *H04L 63/0428* (2013.01); *H04L 2209/84* (2013.01)

(58) Field of Classification Search
CPC ... H04L 67/125; H04L 63/08; H04L 63/0428; H04L 2209/84; B60W 2050/046
See application file for complete search history.

(56) References Cited

U.S. PATENT DOCUMENTS

| | | | |
|---|---|---|---|
| 8,144,612 B2 | 3/2012 | Johnson | |
| 8,306,521 B2* | 11/2012 | Ban | G06F 21/572 |
| | | | 455/419 |
| 9,557,981 B2* | 1/2017 | Throop et al. | G06F 8/61 |
| 10,061,574 B2* | 8/2018 | Mueller et al. | G06F 8/65 |
| 10,353,691 B2* | 7/2019 | Richter et al. | G06F 8/65 |
| 2002/0035429 A1* | 3/2002 | Banas | G06F 8/65 |
| | | | 701/115 |
| 2004/0187011 A1* | 9/2004 | Lee et al. | G06F 21/44 |
| | | | 713/193 |
| 2005/0250525 A1 | 11/2005 | Roughani | |
| 2005/0256614 A1* | 11/2005 | Habermas | G06F 8/65 |
| | | | 701/36 |
| 2007/0100513 A1* | 5/2007 | Asano | G06F 8/65 |
| | | | 701/2 |
| 2009/0119657 A1 | 5/2009 | Link | |
| 2011/0088024 A1* | 4/2011 | Tackett et al. | G06F 8/65 |
| | | | 717/168 |
| 2011/0197187 A1 | 8/2011 | Roh | |

OTHER PUBLICATIONS

Written Opinion of the International Searching Authority (Form ISA/237) for International Application No. PCT/MX2015/000106 dated Mar. 1, 2016 (6 pages).

\* cited by examiner

SYSTEM AND METHOD FOR REPROGRAMMING ECU DEVICES (ELECTRONIC CONTROL UNITS) IN VEHICLES, VIA DIGITAL RADIO

CROSS REFERENCE TO RELATED APPLICATIONS

This application is a continuation under 35 U.S.C. § 371 of International Application No. PCT/MX2015/000106 filed on Jul. 17, 2015, which claims priority to and the benefit of, Mexican Patent Application No. MX/a/2015/009228 filed on Jul. 16, 2015, the entire contents of each are incorporated by reference herein.

BACKGROUND OF THE INVENTION

A vehicle currently has a large number of interconnected devices (the most common ones including gasoline pump, radio, seat control, air conditioning, engine controller, air bags etc.), which, most of the time, have some sort of microcontroller integrated into the electronic control device called Electronic Control Unit (ECU) which is the element that makes decisions based on the software that was downloaded within.

An Electronic Control Unit (ECU) in automobiles allows managing various aspects of the internal combustion operation of the engine.

The electronic control units (ECUs) determine, for example, the amount of fuel injection in engines with injection systems, the ignition time in the combustion chamber, start-up controls, valve distribution controls and other parameters that allow monitoring of the engine through sensors, such as MAP sensor, throttle position sensor, air temperature sensor, oxygen sensor and many other sensors.

Programmable ECUs are required in situations where modifications after the sale of automotive vehicles are important for the final behavior of the engine. As a result of these changes, the old ECU may not provide proper control with the new configuration. In these situations, a programmable ECU is the solution. These can be programmed/mapped while connected to a laptop using a USB cable, while the engine is running, to map parameters such as ignition, water temperature, engine temperature, fuel supply, speed limit, speed control, variable cam timing, among others.

A race ECU is often equipped with a data logger that records the values of all the sensors for further analysis using special software on a computer. This can be very useful for the set-up of the vehicle and is achieved by observing the data looking for anomalies in the data or behavior of the ECUs.

Many recent cars use OBD-II (On-Board Diagnostic system in vehicles) ECUs, which are able to change their programming through an OBD port. Instead of using a new motor control system, one can use appropriate software to adjust the old ECU by reprogramming or updating it. By doing this, it is possible to maintain all functions and wiring while using certain parameter modification programs.

Modern ECUs use a microprocessor that can process the inputs of the motor sensors in real time. An electronic control unit contains hardware and software (firmware). The hardware consists of a set of electronic components that go on a Printed Circuit Board (PCB). The main component of this circuit in a board is a microcontroller chip. The software is stored in the microcontroller or in other chips of the PCB, usually in EPROM memories or in flash memories; that is why the CPU can be reprogrammed by updating the software of these memories or by changing the integrated circuits.

A large number of failures due to mechanical or programming defects in the ECUs are attributable to software problems, which may be due to a large number of circumstances such as poor software development processes, insufficient tests, errors when downloading the program in the microcontroller in the manufacturing plant, etc.

The updating or reprogramming of the software in an ECU requires that the vehicles be brought back to the plant or to the dealerships to execute this operation physically through a PC or other electronic devices that must be connected to the ECU itself of the vehicle in order to download and install the software that will allow its updating and reprogramming.

The updating or reprogramming of the software in an ECU requires the call recall of the vehicles to the plant or to the dealerships to execute this operation physically through a PC or other electronic devices that must be connected to the same ECU of the vehicle in order to execute the download and installation of the software that allows its updating and reprogramming.

Due to the increasing complexity in the features and functionalities of said ECU devices, it is becoming more common every year to be required to take a new car to its corresponding distributor due to a manufacturing defect (which can be a mechanical or programming defect) in order to perform a necessary update or reprogramming of its software.

Taking the above into account, it is easy to understand the scale of this problem within the automotive industry which loses millions of dollars each year due to this type of inconvenience, not to mention the decline in reputation that follows the need to recognize that new or recent vehicles were manufactured with some kind of defect.

Various systems are known in the market that allow the transmission of data to an ECU of a vehicle wirelessly (also called "Over-The-Air" or OTA) or with a wire as the following:

GM (ONSTAR). Technology used: CDMA (Code Division Multiple Access). System used for the following objectives:
  Collision notification system.
  Assistance in case of vehicle theft.
  Assistance on the road.
  Remote car door opening.
  Remote activation of the horn and optical horn.
  Emergency button.
  Remote vehicle diagnosis.

DAIMLER (mbrace2). Technology used: WIFI (HTML5). System used for the following objectives:
  "Infotainment Systems" with applications such as updating FACEBOOK account, navigation etc. (characteristics very similar to the ONSTAR system).

MY FORD TOUCH. Technology used: USB. System used for the following objectives:
  "Infotainment Systems" area.

QNX CAR 2. Technology used: It consists of a unified software platform with applications, information and entertainment, access to all its means of communication and control of the car itself. System used for the following objectives:
  Allows one to use touch or voice commands to play music and other media, use navigation, search for parking, weather reports and post to FACEBOOK. There is even an application called VIRTUAL MECHANIC to easily check on the status of the different systems of the vehicle.

So far, it has been impossible to find a product that performs the reprogramming of electronic ECU control units via digital radio technology (such as HD Radio, Eureka-147 DAB, DRM, CAM-D etc.). Among the closest products, the only ones found are focused on the "Infotainment Systems" area, which means that they only cover the needs of updating the data in the vehicle for issues related to social network use, weather or traffic reports and, in some cases, such as with GM ONSTAR and QNX CAR 2, offer vehicle diagnostics. When it comes to innovation, these products do not transmit the information through the proposed form or method, since they do so by other means such as the Internet, which presents high security problems in the transmission/reception of data from or to the vehicle; not to mention that these products do not attack the problem dealing with this development.

The documents cited below were found while performing a search to determine the closest state of the art.

U.S. Pat. No. 8,607,215 B2, filed on Jul. 21, 2010 and granted on Dec. 10, 2013 to Natsume Mitsuyoshi and assigned to Denso Corporation, protects an electronic control system to rewrite control software in a car and defines a system whose purpose is to reprogram an ECU unit in such a way that the last update of a software is stored without deleting previous versions and where the storage takes place in the ROM/Flash memory of the microcontroller; it is also designed to download a program without taking risks of overwriting, defining a communication protocol of the half duplex type.

However, said patent does not disclose a system and method for the reprogramming of ECU (Electronic Control Units) devices in automotive vehicles, via digital radio, configured and structured as that of the present invention.

U.S. Pat. No. 8,014,446 B2, filed on Dec. 22, 2006 and granted on Sep. 6, 2011 to the inventors Chinmay Shah et al and assigned to holders IBiquity Digital Corporation, protects a method and apparatus to receive and process a digital broadcast signal. The method includes the steps of receiving a digital broadcast signal, including content, storing encoded content, and decoding the stored encoded content to recover the decoded content. The stored encoded content may include units or protocol data packets. The stored encoded content can be recovered by decoding the encoded content. The content may include units or protocol data packets. The stored encoded content can be recovered by decoding the stored encoded content.

However, this patent only protects the method to perform a radio transmission by "HD-IBOC" which has nothing to do with the proposal of the present invention, except that this communication format could be used, among other digital formats of radio (HD Radio, Eureka-147 DAB, DRM, CAM-D etc.), for the transmission of data, that is to say, information that will be used to reprogram an electronic control unit inside a vehicle will be sent via radio. In short, the purpose of this patent is not a new communication protocol.

Another one is U.S. Pat. No. 8,306,521 B2, filed on May 5, 2008 and granted on Nov. 6, 2012, whose inventor is Ban Yoshinori, and (ceded) whose holder is Denso Corporation, which protects a vehicle control apparatus for reprogramming data stored therein on the basis of a reprogramming instruction transmitted to it through a wireless communication network. In the remote reprogramming technique, if the data reprogramming unit installed in the reprogramming station operates abnormally, an abnormal rewrite command could be sent, via the radio communication network, to a destination ECU of a motor vehicle to be reprogrammed.

The vehicle control apparatus for reprogramming data stored therein on the basis of a reprogramming instruction transmitted thereto through a first wireless communication network, which can sometimes be unreliable, said vehicle control apparatus comprising: a receiving unit configured to receive an instruction to deactivate the reprogramming transmitted through a second alternative wireless communication network different from the first wireless communication network, thereby increasing the probability that said blocking instruction was received even if the first network wireless communication is then in an unreliable state; and a deactivation unit configured to deactivate, in accordance with the reprogramming deactivation instruction, any one of: (a) reprogramming the data stored in the vehicle's control apparatus; and (b) receiving an alternative reprogramming instruction transmitted through the first wireless communication network; the use of said second alternative wireless communication network thus increasing the reliability of the data reprogramming systems based on the first wireless communication network by the suppression of the invalid reprogramming, even if the reliability of the first wireless communication network is not guaranteed or if there is a failure in the first wireless communication network. Wherein the first wireless communication network is a cellular network, and the instruction to deactivate reprogramming is transmitted through the second alternative wireless communication network, which may be one of: an FM multiplex broadcast network; an infrared communication network using optical beacons; and a radio communication network using radio beacons.

However, said patent requires the execution of a "bi-directional" communication method and two wireless communication networks, while in the patent proposal it is a "unidirectional or simplex" system, that is, the ECU (Electronic Control Unit) module will not communicate with wireless communication network.

U.S. Pat. No. 6,275,585 B1, filed on Apr. 28, 1998 and granted on Aug. 14, 2001 to Sewin F. Ablay et al, and assigned to Motorola, Inc, protects a communication system (100) that includes an infrastructure (150) and at least one vehicle (101), the vehicle including at least one vehicle system (103), and at least one user system (113). The infrastructure includes an application (155) which, in turn, is arranged to reprogram the vehicle system, the user system, or both. However, the patent establishes a bidirectional communication system and this does not reveal, nor suggest a system and method for the reprogramming of ECU devices (Electronic Control Units) in motor vehicles, via digital radio, configured and structured as the one of the present invention.

Another patent is U.S. Pat. No. 8,144,612B2, filed on Apr. 15, 2009 and granted on Mar. 27, 2012 to Steven Andrew Johnson, et al., and assigned to IBiquity Digital Corporation, which protects systems, methods and processor-readable media for the encoding and transmission of first and second media contents using a digital radio broadcasting system, such that the second media content can be generated in synchronization with the first media content by a receiver of digital radio broadcasting. The systems described, the methods and the means readable by the processor determine when a receiver will cause the audio and data content to be transmitted at a given time via digital radio broadcasting transmitter, and allow the content of the media to be adjusted accordingly to provide the synchronized representation.

However, this patent only protects the method for performing a "HD" radio transmission which has nothing to do with the subject-matter proposed by the present invention, except that this communication format could be used, among other digital radio formats (HD Radio, Eureka-147 DAB, DRM, CAM-D etc.), for the transmission of data, that is to say, information that will be used to reprogram an electronic control unit inside a vehicle will be sent via radio. In short, the purpose of this patent is not a new communication protocol.

The present invention was developed based on the need to have a system and method for the reprogramming of ECU devices (Electronic Control Units) in automobiles. Said invention offers a practical, fast, efficient and economical way to update and/or reprogram said ECU devices in vehicles via digital radio technology (HD Radio, Eureka-147 DAB, DRM, CAM-D etc.).

OBJECTIVES OF THE INVENTION

The main objectives of the present invention are a novel system and a method for the reprogramming of ECU devices (Electronic Control Units) in vehicles via digital radio, which allows new software files to be transmitted when synchronizing a radio station, automatically downloading new updates without having to take the vehicle directly to an auto dealership.

Another objective of the invention is that said system and method for the reprogramming of ECU devices (Electronic Control Units) in vehicles via digital radio also offer security in the transmission of software files via radio waves without risk of fragmented or incomplete transmissions.

Another objective of the invention is that said system and method for the reprogramming of ECU devices (Electronic Control Units) in vehicles via digital radio also allow avoiding the loss of reputation of the different brands of vehicles in which this type of failures occur, by solving them remotely, indirectly, quickly, practically and efficiently.

Another objective of the invention is that said system and method for the reprogramming of ECU devices (Electronic Control Units) in vehicles via digital radio also allow reprogramming any ECU of any brand of vehicle in a fast and practical manner, and at any time of the day, with the only requirement that the vehicle be switched off before starting the reprogramming process.

In addition, several other objectives and advantages will become apparent throughout the general and detailed description of the present invention supported by the illustrated embodiments.

BRIEF DESCRIPTION OF THE INVENTION

In general, the system for the reprogramming of ECU devices (Electronic Control Units) in vehicles via digital radio, in accordance with the present invention, consists of: means for encrypting audio files with software files for updating or reprogramming ECUs of vehicles generating a first encrypted packet and means to encrypt in parallel files of data and vehicle information files by adding a header with the data referring to the vehicle model (data of the Original Equipment Manufacturer (OEM), model of the vehicle, vehicle year, vehicle platform, ECU identification data (ID), data packet size, software file key, end of file data) and the specific ECU that will be the final recipient of the information, generating a second encrypted packet; means for mixing said first encrypted packet and said second packet encrypted via digital radio technology to be transmitted simultaneously from a radio broadcasting station in digital format; means for receiving said first and second packets encrypted by digital radio receiver that are sent to the ECUs located in the vehicles; memory means for storing said first and second encrypted packets; means for demodulating the received digital radio signal and separating the first encrypted packet (audio files+software files) from the second encrypted packet (data files and information files concerning the vehicle); means for decrypting said first encrypted packet to separate the audio files and the software files) and decrypting said second encrypted packet to separate the data files and the vehicle information files, to finally obtain the software files and the files of vehicle information specially identified and configured for each type of vehicle and each specific ECU, which are retransmitted within the bus of the ECU device through the internal network of the vehicle, so that all ECUs receive the message simultaneously but the ECU to be reprogrammed is the only one that responds to the transmitted message. The receiving ECU of the information after authenticating the information proceeds to auto-reprogram with the software file received in the application memory.

The receiving ECU inside the vehicles receives the data coming from the bus in a redundant manner towards two microcontrollers defined by a main microcontroller and a supervisory microcontroller. The function of this dual configuration is to be able to receive, store and compare the data coming from the bus, corroborating later on that the information received was the same in the two microcontrollers, thus ensuring the correct interpretation of the information received.

In the preferred embodiment of the invention, the data files with vehicle information files adding a header with data referring to the vehicle model and the specific ECU that will be the final recipient of the information, contain an identification key, data from the original equipment manufacturer (OEM), vehicle model, year of the vehicle, vehicle platform, ECU identification (ID) data, data packet size; key of the software file, end of file data, which make up data packets that are mixed with the audio files.

To carry out the transmission of the information, the receiving ECU must be in reprogramming mode in order to receive the data coming from the communication bus and finally install the new software in the application memory.

The method for the reprogramming of ECU devices (Electronic Control Units) in vehicles via digital radio, in accordance with the present invention consists of: a) selecting a software file to be transmitted to one or more predefined vehicles which are tuning to the specific frequency of the digital radio transmission at that moment; b) encrypting the software file with audio files generating a first encrypted packet, so that it cannot be read and/or analyzed by any agent outside the transition-reception process; c) encrypting data files with information files of the vehicle by adding a header with the data referring to the vehicle model (original equipment manufacturer (OEM) data), vehicle model, year of the vehicle, vehicle platform, identification data (ID) of the ECU, size of the data packet, key of the software file, end of file data) and the specific ECU that will be the final recipient of the information, generating a second encrypted packet; d) mixing said first encrypted packet and said second encrypted packet via digital radio technology to be transmitted simultaneously from a radio broadcast station in digital format. e) receiving said first and second encrypted packets by means of a radio frequency of the vehicle digital radio receiver, which are sent to the ECU and stored in a non-volatile memory; f) demodulating the digital radio signal and separating the first encrypted packet (audio files+files from a software) from the second encrypted packet (data files and vehicle information files); g) decrypting said first encrypted packet to separate the audio files and the files from a software; and decrypting said second encrypted packet to separate the data files and the vehicle information files, to finally obtain the software files and the vehicle information files specially identified and configured for each type of vehicle and each specific ECU; h) retransmitting within the bus of the ECU device through the internal network of the vehicle, so that all ECUs receive the message simultaneously but the ECU to be reprogrammed is the only one that responds to the transmitted message. i) auto reprogramming the ECU with the software file after authenticating the information. In order to better understand the features of the present invention, the present description, which forms an integral part thereof, is accompanied by the drawings that are illustrative but not limitative and are described below.

Figure 1:
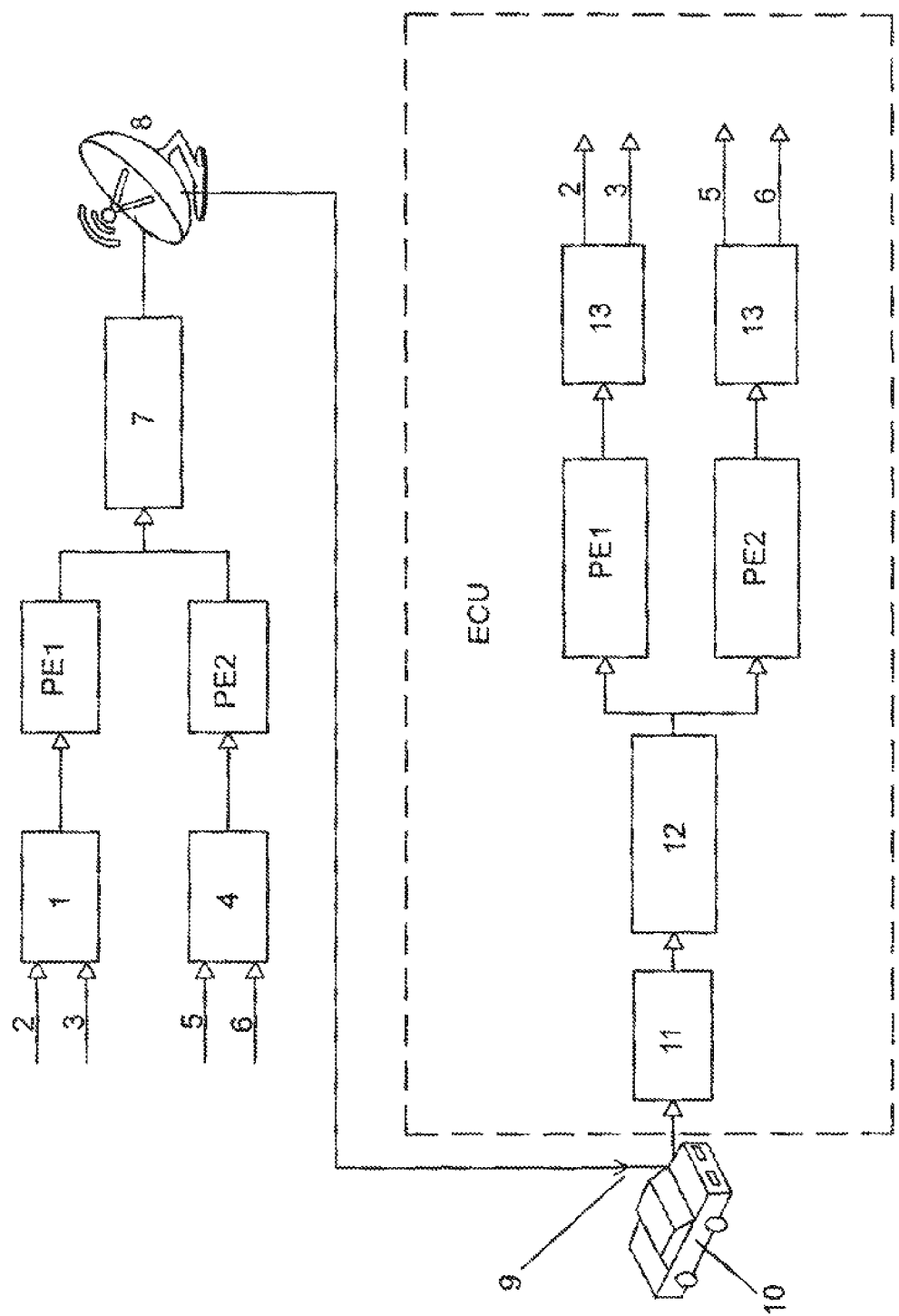
FIG. 1 shows a block diagram that illustrates, in a general manner, the different blocks that make up the system for the reprogramming of ECU devices (Electronic Control Units) in vehicles via digital radio, in accordance with the present invention.

For a better understanding of the invention, a detailed description will be made of some of the embodiments thereof, shown in the drawings that are attached to the present description for non-limiting illustrative purposes.

DETAILED DESCRIPTION OF THE INVENTION

The characteristic details of the system and method for the reprogramming of ECU devices (Electronic Control Units) in automotive vehicles, via digital radio, are clearly shown in the following description and in the accompanying illustrative drawings, using the same reference signs to designate the same parts.

FIG. 1 shows a block diagram that comprises the system for the reprogramming of ECU devices (Electronic Control Units) in vehicles via digital radio, consisting of: first encryption means 1 for encrypting audio files 2 with a new software file 3 for updating or reprogramming vehicle ECUs 10, generating a first encrypted packet PE1 and second encryption means 4 for encrypting in parallel data files 5 and vehicle information files 6 by adding a header with the data referring to the vehicle model [original equipment manufacturer (OEM) data, vehicle model, vehicle year, vehicle platform, ECU identification (ID) data, data packet size; key of the software file, end of file data] and the specific ECU that will be the final recipient of the information, generating a second encrypted packet PE2; mixing means 7 for mixing said first encrypted packet PE1 and said second encrypted packet PE2 via digital radio technology to be transmitted simultaneously from a radio broadcasting station in digital format 8; receiving means of digital radio signal 9 for receiving said first and second encrypted packets PE1 and PE2 which are sent to the receiving ECU of the vehicles 10; memory means 11 for storing said first and second encrypted packets PE1 and PE2; demodulator means 12 for demodulating the received digital radio signal and separating the first encrypted packet PE1 from the second encrypted packet PE2; decryptor means 13 for decrypting said first encrypted packet PE1 to separate the audio files 2 and the software files 3 and decrypt said second encrypted packet PE2 to separate the data files 5 and the vehicle information files 6, to finally obtain the software files 3 and the vehicle information files 6, specially identified and configured for each type of vehicle 10 and each specific ECU; which are sent to the predetermined ECUs where the boot sequence starts and where a boot loader stores the new software in a flash memory where it is executed.

Figure 2:
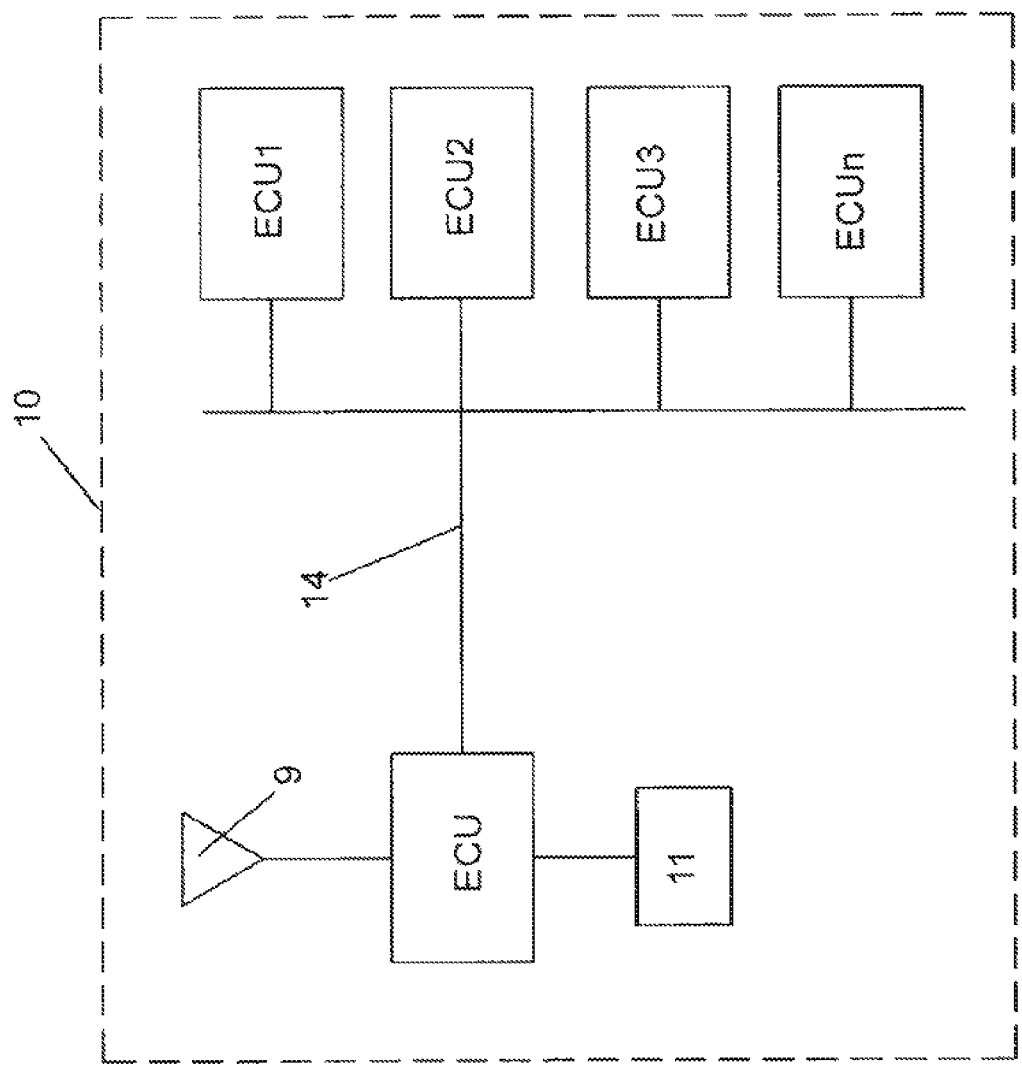
FIG. 2 illustrates the configuration of the elements of the electronic system of the vehicle with the receiving ECU, the storage memory and the transfer system (bus) of data and software to the different ECUs that will be reprogrammed or updated.

FIG. 2 illustrates the configuration of the elements of the electronic system of the vehicle with the receiving ECU, the storage memory and the transfer system (BUS) of data and software to the different ECUs that will be reprogrammed or updated. In said figure, the digital radio signal receiving means 9 of the vehicle receives the radiofrequency waves (which carry the encrypted audio and software files defining the first encrypted packet PE1, the encrypted data and vehicle information files, defining the second encrypted packet PE2, which are sent to the receiving ECU of said vehicle 10 and stored in the non-volatile memory means 11 until the reception and download is complete and satisfactory. Said receiving ECU converts said radiofrequency waves into a received file format, that is to say, executes the demodulation process to separate the first encrypted packet PE1 from the second encrypted packet PE2 and the decryption process in order to separate the different files and obtain them separately so that the software file is completely rebuilt; same that is transmitted within the bus 14 of the receiving ECU device through the internal network of the vehicle, so that all the ECUs (ECU1, ECU2, ECU3, . . . ECUn) of the electronic system of the vehicle receive the message simultaneously, but the ECU to be reprogrammed is the only one that responds to the transmitted message.

Figure 3:
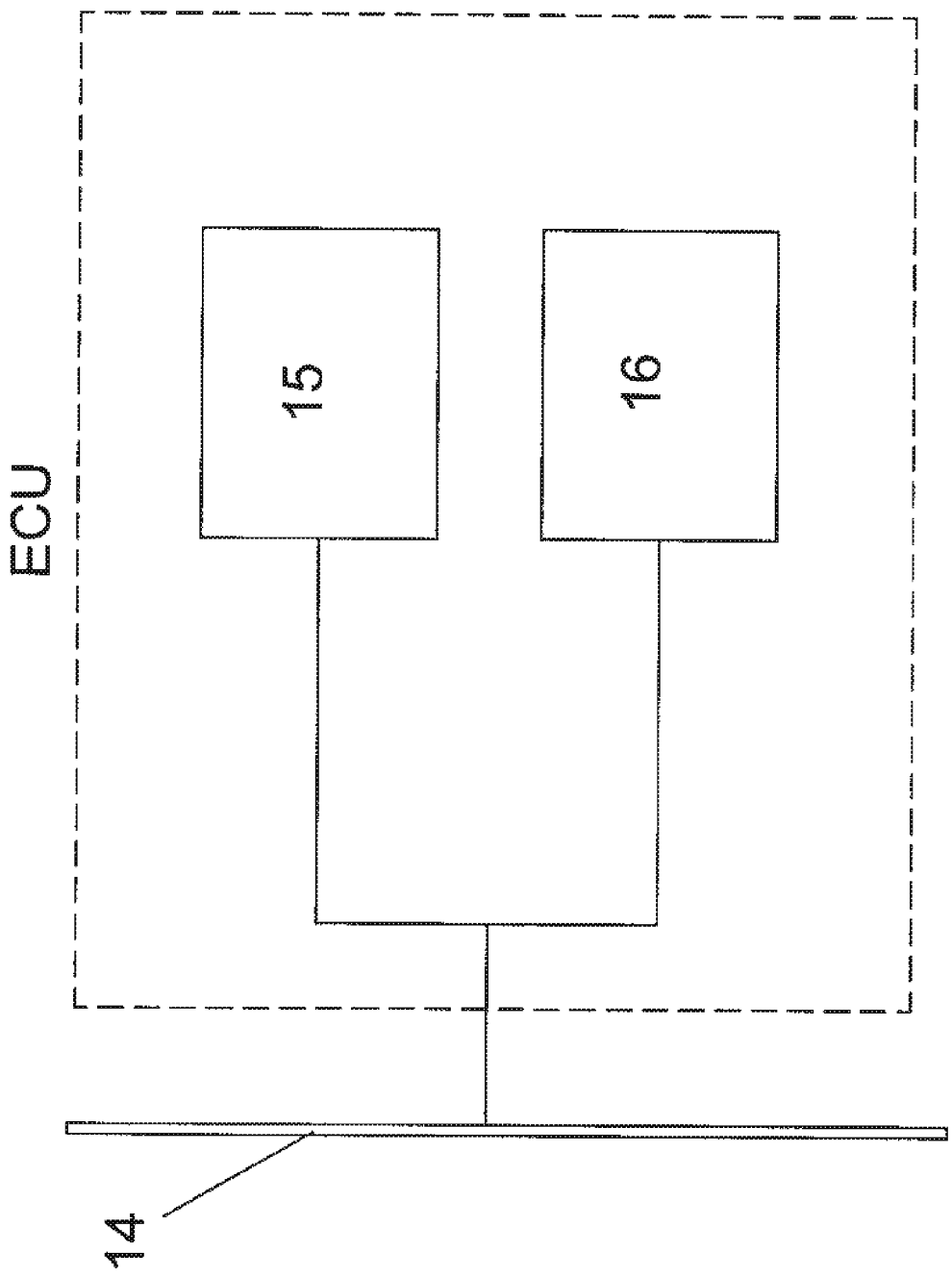
FIG. 3 illustrates the hardware necessary for the proper download of the information from the digital radio station, according to the system for the reprogramming of ECU devices (Electronic Control Units) in vehicles via digital radio, in accordance with the present invention.

FIG. 3 illustrates the hardware required for the adequate download of the information coming from the digital radio station, according to the system for the reprogramming of ECU devices (Electronic Control Units) in vehicles via digital radio, in accordance with the present invention. In said figure, the receiving ECU of the vehicle receives the data coming from the bus 14 in a redundant manner towards a dual configuration of microcontrollers defined by a main microcontroller 15 and a supervisory microcontroller 16 that allows receiving, storing and comparing the data coming from the bus 14, corroborating later among them that the information received was the same in the two microcontrollers 15, 16, thus ensuring the correct interpretation of the information.

Figure 4:
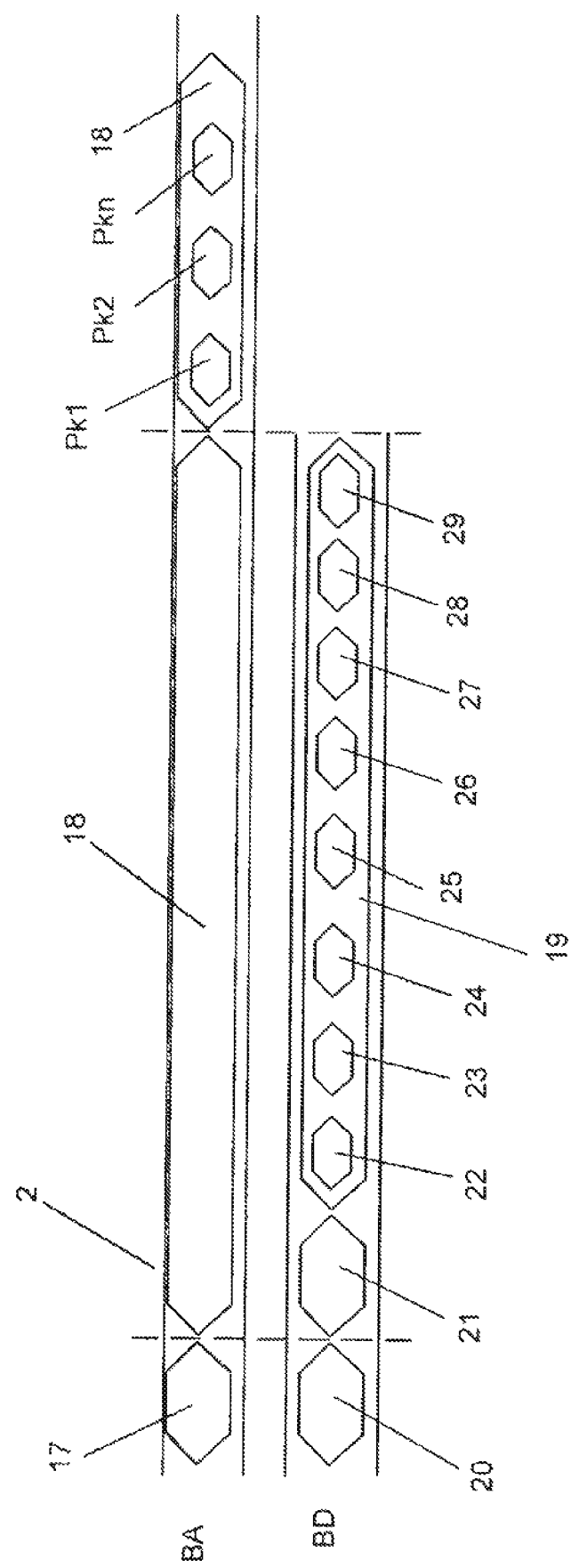
FIG. 4 shows a diagram of the decomposition of the file to be transmitted/received by the system and method for the reprogramming of ECU devices (Electronic Control Units) in vehicles via digital radio, in accordance with the present invention.

FIG. 4 shows a scheme of the decomposition of the file to be transmitted/received by the system and method for the reprogramming of ECU devices (Electronic Control Units) in vehicles via digital radio, in accordance with the present invention. Said figure illustrates an audio band BA of the end 17 of an audio file 2, an audio only section 18 followed by data packets Pk1, Pk2 . . . Pkn that have been encrypted in the audio only sections 18 of the audio files 2. A data band BD is also illustrated which shows a data file 19 containing data that has identifiers such as start of frame 20 and an identification key 21, data types which can be incorporated such as data from the original equipment manufacturer (OEM) 22, vehicle model 23, year of vehicle 24, vehicle platform 25, identification data (ID) of the ECU 26, packet size of data 27 are also shown, key of the software file 28 and end of file data 29 that are packaged and encrypted in the audio sections 18 of the audio files 2.

The algorithm for checking the reception of data packets to be received in accordance with the method and system for the reprogramming of ECU devices (Electronic Control Units) in vehicles via digital radio, in accordance with the present invention, is as follows: the beginning of the process is observed, followed by a first verification step where the ID of the packet corresponding to the vehicle that should receive it is verified; if it is the case, it goes on to the second verification step where it is verified whether the download sequence of the program is being executed; if it is the case, the process goes on to the third verification step where it is verified whether the packet number corresponds to the next to be received; if it is the case, a first storage operation of the packet is executed, going on to the fourth verification step where it is verified whether all the packets were received; if it is the case, the process stops, and if it is not the case, the process starts again.

If the program download sequence is not executed in the second verification step, then the process goes on to a fifth verification step where it is verified whether the information packet is the first to be stored in the ECU device; if it is the case, a second operation is executed where the number of packets to be received is determined and the packet counter begins from zero, consequently passing to the first storage operation of the packet; and if it is not the case, the process returns to the first verification step.

If in the third verification step, the packet number does not correspond to the next one to be received, the process returns to the first verification step.

The reprogramming control algorithm of the ECU according to the method and system for the reprogramming of ECU devices (Electronic Control Units) in vehicles via digital radio, in accordance with the present invention is as follows: the beginning of the process, followed by a first verification step where it is verified whether the vehicle key is in the off position; if not, the process is completed and, if it does, it goes on to a first operation wherein a message is sent to stop all transmissions of the bus, then, in a second operation, a message is sent to the receiving ECU module defining the start of reprogramming and, consecutively, in a third operation, a message is sent to the receiving ECU module with the number of bytes to be transmitted; in a fourth operation the packet is transited; then, in a second verification step, it is verified if the total number of packets has been transmitted, if not, it is returned to the fourth operation and, if it was, the reception of the sum of verification is then carried out in a fifth operation, and then, in a third verification step, the value of the verification sum is verified; if it is incorrect, the process returns to the first operation before repeating the cycle; if it is correct, then it finally goes on to the sixth operation where a reset message is sent to the receiving ECU and the process ends.

Figure 5:
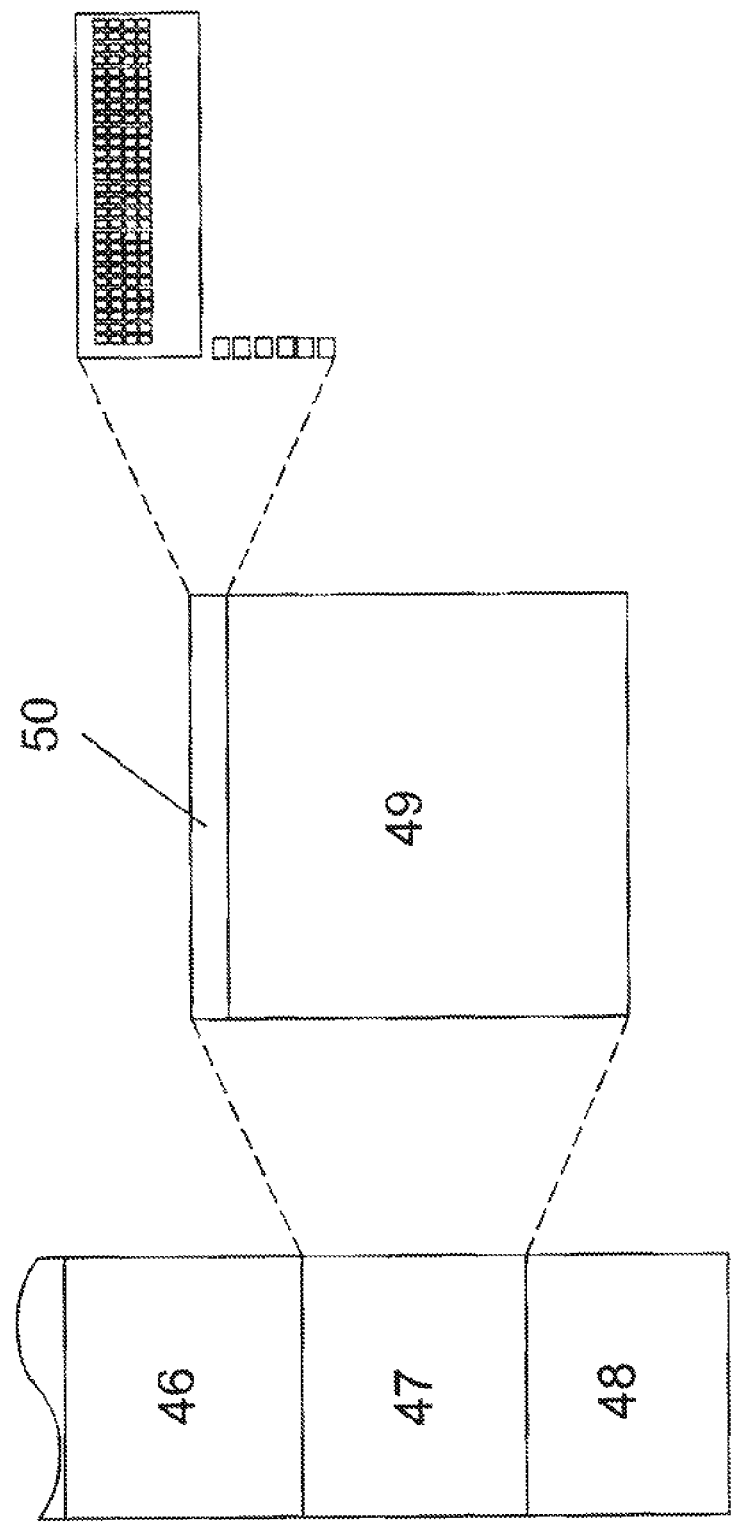
FIG. 5 illustrates the definition of the header of the data files encrypted with vehicle information files adding on the basis of the proposed memory map for every code file to be transmitted.

FIG. 5 illustrates the definition of the header of the data files encrypted with vehicle information files by adding on the basis of the memory map proposed for every code file to be transmitted. Said figure illustrates a memory map showing the calibration segment 46, the application segment 47 and the boot loader segment 48; wherein the application segment derives a segment of the program code in standard format 49 with an ASCII section header 50 where the vehicle ID, the receiving ECU ID, is involved; where the data of the vehicle ID and receiving ECU ID and other data are entered after the last memory section written in a valid format.

The invention was described in sufficient details so as to allow a person with average skill in the art to reproduce and obtain the results mentioned in the present invention. However, any person skilled in the art of the present invention may be able to make modifications not described in the present application. Nevertheless, if the subject matter claimed in the following claims is required for the application of these modifications in a given structure or manufacturing process thereof, said structure or process should be understood to be within the scope of the invention.

The invention claimed is:

1. A system for the reprogramming of one or more Electronic Control Units (ECU) devices in a vehicle via digital radio, comprising
encrypted audio files with reprogramming software of files for reprogramming one or more Electronic Control Units (ECU) devices in the vehicle creating a first encrypted packet;
encrypted data files and vehicle information files comprising a header creating a second encrypted packet;
a radio broadcast station to transmit said first and second encrypted packets simultaneously in digital format by a digital radio signal;
a receiving Electronic Control Units (ECU) device located in said vehicle configured to receive said first and second encrypted packets via a digital radio receiver;
nonvolatile memory for storing said first and second encrypted packets in the vehicle;
wherein said receiving Electronic Control Units (ECU) device demodulates the received digital radio signal and separates the first encrypted packet from the second encrypted packet;
wherein said receiving Electronic Control Units (ECU) device decrypts said first and second encrypted packets to separate the audio files from the software files and the data files from the vehicle information files; wherein said receiving Electronic Control Units (ECU) device comprises a bus that retransmits said audio files, reprogramming software files, data files and vehicle information files through an internal network of the vehicle so that a plurality of further Electronic Control Units (ECU) devices in the vehicle can receive the retransmitted files simultaneously; and after authenticating the information, the plurality of further Electronic Control Units (ECU) devices may auto-reprogram with the software files received in an application memory.

2. The system for the reprogramming of one or more Electronic Control Units (ECU) devices in the vehicle via digital radio according to claim 1, wherein the Electronic Control Units (ECU) devices to be reprogrammed comprise a main microcontroller and a supervisory microcontroller that receive data coming from the bus in a redundant manner which allows for receiving, storing and comparing the data coming from the bus, and corroborating later that the information received was the same in the two microcontrollers, thus ensuring a correct interpretation of the information received.

3. The system for the reprogramming of one or more Electronic Control Units (ECU) devices in the vehicle via digital radio according to claim 1, wherein the data files and the vehicle information files, having both been encrypted with an additional header, contain data about a model of the vehicle, the specific Electronic Control Units (ECU) devices in the vehicle to receive said information, identification key information, data about an original manufacturer of the vehicle and the Electronic Control Units (ECU) devices within said vehicle, a year that the vehicle was manufactured, vehicle platform information, identification data about the receiving Electronic Control Units (ECU) device, a size of the first and second encrypted packets, the key of the software files and end of file information of the data packets that are packaged and encrypted in the audio sections of the audio files.

4. A method for the reprogramming of one or more Electronic Control Units (ECU) devices in one or more vehicles via digital radio, comprising the steps of:
  a) selecting a software file to be transmitted to one or more predefined vehicles which are tuned to a specific frequency of digital radio transmission at that moment;
  b) encrypting the software file with audio files generating a first encrypted packet;
  c) encrypting data files with vehicle information files by adding an identification header, generating a second encrypted packet;
  d) using a radio broadcast station to mix said first encrypted packet and said second encrypted packet and simultaneously transmit said first encrypted packet and said second encrypted packet in digital format by a digital radio signal;
  e) receiving said first and second encrypted packets by means of a receiver of digital radio frequency radio signals of each vehicle, which are sent to a receiving Electronic Control Units (ECU) device and stored in a non-volatile memory;
  f) using the receiving Electronic Control Units (ECU) device to demodulate the digital radio signal and separate the first encrypted packet from the second encrypted packet;
  g) using the receiving Electronic Control Units (ECU) device to decrypt said first encrypted packet and to separate the audio files and software files and to decrypt said second encrypted packet and to separate the data files and the vehicle information files;
  h) using a bus of the receiving Electronic Control Units (ECU) device to retransmit the software files and data files within the bus through an internal network of the one or more vehicles, so that a plurality of further Electronic Control Units (ECU) devices of an electronic system of the one or more vehicles receive the software and data files simultaneously; causing an Electronic Control Units (ECU) device intended to be reprogrammed to be the only Electronic Control Units (ECU) device responding to the transmitted software files and data files;
  i) auto-reprogramming the intended Electronic Control Units Units (ECU) device with the software files after said intended Electronic Control Units (ECU) device authenticates the information on the data files received in step h).

* * * * *